Patented Sept. 29, 1936

2,055,482

UNITED STATES PATENT OFFICE 2,055,482

LUBRICATING COMPOSITION AND METHOD FOR MAKING SAME

Garland H. B. Davis, Baton Rouge, La., assignor to Standard Oil Development Company No Drawing. Application July 23, 1932, Serial No. 624,356

9 Claims. (Cl. 87—9)

The present invention relates to the production of improved lubricants and more particularly to oils, especially those containing waxy constituents, so as to produce oils of low pour point. My improved lubricants and the method of producing them will be fully understood from the following description:

Mineral oils of the higher grade contain waxy constituents which cause the oil to solidify or congeal at relatively elevated temperatures, for example at 30, 40, 50° F. or even higher, and if it were not for this fact the oils would be of great use as lubricants at temperatures considerably below these temperatures. In ordinary refining practice waxy oils are chilled and the wax is mechanically removed, but these are expensive processes and the lubricating quality of the oil is not improved by the removal of the wax. I have discovered substances or, rather, a class of substances, which can be added to the oil and which due to some obscure effect of the crystal form or crystal growth, enable these waxy oils to remain liquid at temperatures far below their normal solidification points.

The products which I prefer to use for this purpose are by-products of the oxidation of paraffin wax and similar waxy hydrocarbons to form acids and other oxygen-containing materials. The method of oxidizing paraffin is generally known and is accomplished by blowing air or other oxidizing gases through the melted wax at temperatures not far above their melting point, for example at 100 to 170° C. The oxidation may be conducted in batch or continuously, preferably removing a portion of the wax continuously and replacing it with fresh wax so as to hold the acid number below 50 or 60 or thereabout, and so as not to precipitate tarry materials. The oxidation is also preferably carried out in the presence of catalysts, although this is not necessary, such as previously oxidized paraffin or cobalt and manganese salts such as the resinates or oleates or other well known siccative, or barium cinnamate or aluminum in the shape of balls or other contact means, and generally in an apparatus made of aluminum or aluminum lined.

The lighter oxidation products generally go overhead with the oxidizing gas and the heavier products are separated from the wax by saponification and solution of the resulting soap. The unoxidized paraffin may be returned for further oxidation and the acids may be purified in various ways, for example by reacidification, drying and distillation under vacuum. The still bottoms produced in this latter process is the product with which I am now concerned. This material is a reddish-brown to black material which is a polymer produced during the oxidation, and varies in consistency from an oily viscous liquid to a solid or semi-solid with a rubbery appearance. The particular nature of the polymer is not fully understood. It may contain oxygen or it may be free of oxygen depending on the particular conditions, but in either case it is endowed with valuable pour inhibiting properties. As an example of the action of this new inhibitor the following may be taken as illustrative:

Wax obtained from petroleum and having a melting point of about 122° F. was oxidized in substantially the same manner as indicated in the description above, by blowing therethrough a stream of air at a temperature of 120 to 150 C. for a period of two to four hours, while in the presence of a catalyst of the type listed above. The acid recovered comprised 60% of the original wax and the still bottoms left on vacuum distillation comprised 9 to 10% of the original wax. The product had the folowing characteristics:

| | |
|---|---|
| Specific gravity | .98 |
| Color | Black |
| Viscosity at 210° F. | 590 Secs. Saybolt |
| Solubility in naphtha | 24% |
| in benzol | 43% |
| in acetone | 5% |
| Ultimate analysis—Carbon | 68.40% |
| Hydrogen | 12.85% |
| Oxygen | 18.75% by difference |

The viscous oily material was of high molecular weight and had the appearance of a colloid.

This material is added in proportion of 1% to a Pennsylvania spindle oil and the properties of the original and the blended oils are as follows:

| | Unblended oil | Blend 1% |
|---|---|---|
| Gravity | 31° A. P. I. | |
| Vis. at 100° F | 157 Secs. Saybolt | 165 Secs. |
| Vis. at 210° F | 44.5 Secs. Saybolt | 44.8 Secs. |
| Viscosity index | 110 | 105. |
| Pour | 30° F | −10° F. |
| Flash | 395° F | 395° F. |

It will be observed that the blending agent has made substantially no change in the ordinary properties of the oil except as to its pour point which is reduced by some 40° F. and it was darkened in color. The material may be used in proportions generally less than 10% or even 5% and if it is used in this amount it generally produces a slight thickening of the oil. But it is usually effective in quantities as low as ½ of 1% and in this proportion causes little change in the viscosity. It may be used in oils of various viscosities but it is generally found to be most effective in those of lower viscosities, that is to say, below 70 or 80 seconds Saybolt at 210° F. but may be used in heavier oils such as cylinder oils and the like.

The above description has been substantially limited to the preferred product which, as stated above, is a by-product of wax oxidation. However, other materials may be used to produce my improved pour inhibitor. In general it is necessary that the raw material be rich in long, principally straight, hydrocarbon chains of the type found in paraffin wax and containing from say 10 to 20 carbon atoms to the molecule, or even more. As indicated above, the hydrocarbons themselves such as paraffin wax can be used as the source of this material, but other materials are likewise used, for example oxygen treatment of the waxy acids produced by the oxidation of paraffin wax or the natural acids such as stearic, oleic, palmitic and the like produces materials which will serve my purpose. Heavy alcohols containing long hydrocarbon chains as indicated above may also be used as well as the corresponding aldehydes or esters. All of these materials either in pure form or as mixtures may be polymerized by the treatment at low temperatures with gases rich in free oxygen.

The treatment in general may be carried out just as the wax oxidation is performed at low temperatures, preferably from 120 to 150° C. and the oxidation should be stopped before tarry products are produced in any substantial amount. On the other hand, it is possible to produce my pour inhibitor even when tarry products are produced in large amounts. When materials other than paraffin wax are used for oxidation I may also use the catalysts which are indicated above and I consider it desirable to use the catalysts in all cases, although not necessary.

While as indicated above the whole residual product of the vacuum distillation may be used, it has also been found that suitable extracts of the product have the same power, for example, the extracts obtained with solvents selected from the class of naphtha, benzol, carbon disulphide, and carbon tetrachloride are desirable, while the product of extraction with acetone has little or no inhibiting power. However, solvents may be used, such as lubricating oils, either natural or synthetic, and even oils such as have pour inhibiting properties themselves, for example, condensation products of chlorparaffin alone or with aromatics such as naphthalene, benzol and the like.

Although the primary purpose of my invention is to produce low pour oils the product which I make is also satisfactory for other purposes and may be added to oils which do not contain substantial quantities of wax for the purpose of modifying their lubricating qualities. It also may be added to grease compositions with desirable results.

My invention is not to be limited by any theory of the oxidation process or of the mechanism of pour reduction, nor to the specific material produced by the oxidation of paraffin wax, nor to the product of a polymerization in the presence of any particular catalyst, but only by the claims in which I wish to claim my invention as broadly as the art permits.

I claim:

1. An improved process for producing pour inhibitors comprising subjecting waxy hydrocarbons and their partial oxidation products containing principally straight chain hydrocarbon groups to continued action of oxidizing gas at low temperature, removing acidic substances by treatment with alkali and distilling off unreacted material under high vacuum.

2. An improved process for producing pour inhibitors comprising low temperature oxidation of paraffin wax, removal of acidic constituents by treatment with alkali and separation of unreacted wax by vacuum distillation.

3. Process for producing a pour inhibitor for use in waxy oil comprising subjecting an organic material having a straight hydrocarbon chain of at least 10 carbon atoms to low temperature oxygen treatment, whereby an oxygen containing polymer of the type described is produced along with acidic substances and other oxidation products, separating said acidic substances and the major quantity of said other products of oxidation and recovering said polymer as a distillation residue.

4. Process according to claim 3 in which the organic material is an acid.

5. Process according to claim 3 in which the organic material is an alcohol.

6. Composition of matter comprising a waxy hydrocarbon oil and .5 to 5% of an oxygen containing polymer capable of reducing the pour point of the oil prepared by low temperature oxygen treatment of an organic material having a hydrocarbon chain of at least 10 carbon atoms and separated from the major quantity of other oxidation products by distillation of such other materials whereby the polymer is recovered as a residue.

7. Composition of matter comprising a waxy hydrocarbon oil and .5 to 5% of a pour inhibitor, comprising a polymer containing oxygen prepared by low temperature oxygen treatment of an organic acid having a long hydrocarbon chain of at least 10 carbon atoms, whereby said polymer is produced along with other oxidation products, separating the unconverted acid and said other oxidation products and recovering the polymer as a distillation residue.

8. Composition of matter comprising a waxy hydrocarbon oil and .5 to 5% of a pour inhibitor, comprising a polymer containing oxygen, prepared by low temperature oxygen treatment of an alcohol having a long hydrocarbon chain of at least 10 carbon atoms, whereby said polymer is produced along with other oxidation products, separating the unconverted alcohol and said other oxidation products by distillation and recovering the polymer as a residue.

9. An improved composition of matter comprising a waxy hydrocarbon oil and a polymer for pour depression prepared by subjecting waxy hydrocarbons and their partial oxidation products containing principally straight hydrocarbon chains to the continued action of an oxidizing gas at low temperature, separated from the acidic substances and recovered by distilling off unpolymerized materials.

GARLAND H. B. DAVIS.